US011820341B2

(12) United States Patent
Shelton, III

(10) Patent No.: US 11,820,341 B2
(45) Date of Patent: Nov. 21, 2023

(54) ELECTRICALLY MODULATED AIR BRAKE

(71) Applicant: Valcrum, LLC, Cypress, TX (US)

(72) Inventor: Alton L. Shelton, III, Cypress, TX (US)

(73) Assignee: VALCRUM, LLC, Cypress, TX (US)

( * ) Notice: Subject to any disclaimer, the term of this patent is extended or adjusted under 35 U.S.C. 154(b) by 94 days.

(21) Appl. No.: 17/449,366

(22) Filed: Sep. 29, 2021

(65) Prior Publication Data

US 2022/0105915 A1 Apr. 7, 2022

Related U.S. Application Data

(60) Provisional application No. 63/086,525, filed on Oct. 1, 2020.

(51) Int. Cl.
*B60T 13/26* (2006.01)
*B60T 13/68* (2006.01)
*B60T 13/38* (2006.01)
*B60T 17/18* (2006.01)

(52) U.S. Cl.
CPC .......... *B60T 13/265* (2013.01); *B60T 13/268* (2013.01); *B60T 13/683* (2013.01); *B60T 17/18* (2013.01); *B60T 13/385* (2013.01)

(58) Field of Classification Search
CPC ...... B60T 13/26; B60T 13/261; B60T 13/263; B60T 13/265; B60T 13/268; B60T 13/36; B60T 13/38; B60T 13/385; B60T 13/683; B60T 17/18

See application file for complete search history.

(56) References Cited

U.S. PATENT DOCUMENTS

| | | | | |
|---|---|---|---|---|
| 4,697,852 A * | 10/1987 | Scholz | ................. | B60T 13/263 188/106 R |
| 5,118,165 A * | 6/1992 | Latvala | ................. | B60T 13/261 188/170 |
| 5,382,085 A * | 1/1995 | Zbinden | ................. | B60T 13/74 303/10 |
| 5,806,937 A * | 9/1998 | Brunson | ............... | B60T 13/686 188/34 |
| 2002/0195870 A1* | 12/2002 | Brunson | ............... | B60T 11/108 303/123 |
| 2007/0040353 A1* | 2/2007 | Dallaire | ................. | B60Q 1/305 280/476.1 |
| 2019/0202423 A1* | 7/2019 | Bongaerts | ............. | B60T 8/1837 |

\* cited by examiner

*Primary Examiner* — Thomas J Williams
(74) *Attorney, Agent, or Firm* — BOTKIN & HALL, LLP

(57) ABSTRACT

A system for electrically controlling air brakes on a trailer having an electrically actuated valve for releasing pressurized air at a controlled rate. The trailer is connectable to a standard electrical connector on a towing vehicle that provides a proportional braking signal. The proportional signal is sent to a controller that actuates the electrically actuated valve. When the controller receives the proportional braking signal from the towing vehicle representing no braking force, the controller actuates the electrically actuated valve to produce no air pressure to the air brake. When the controller receives the proportional braking signal from the towing vehicle representing full braking force, the controller actuates the electrically actuated valve to provide air to the air brake corresponding to full braking force of the air brakes.

12 Claims, 5 Drawing Sheets

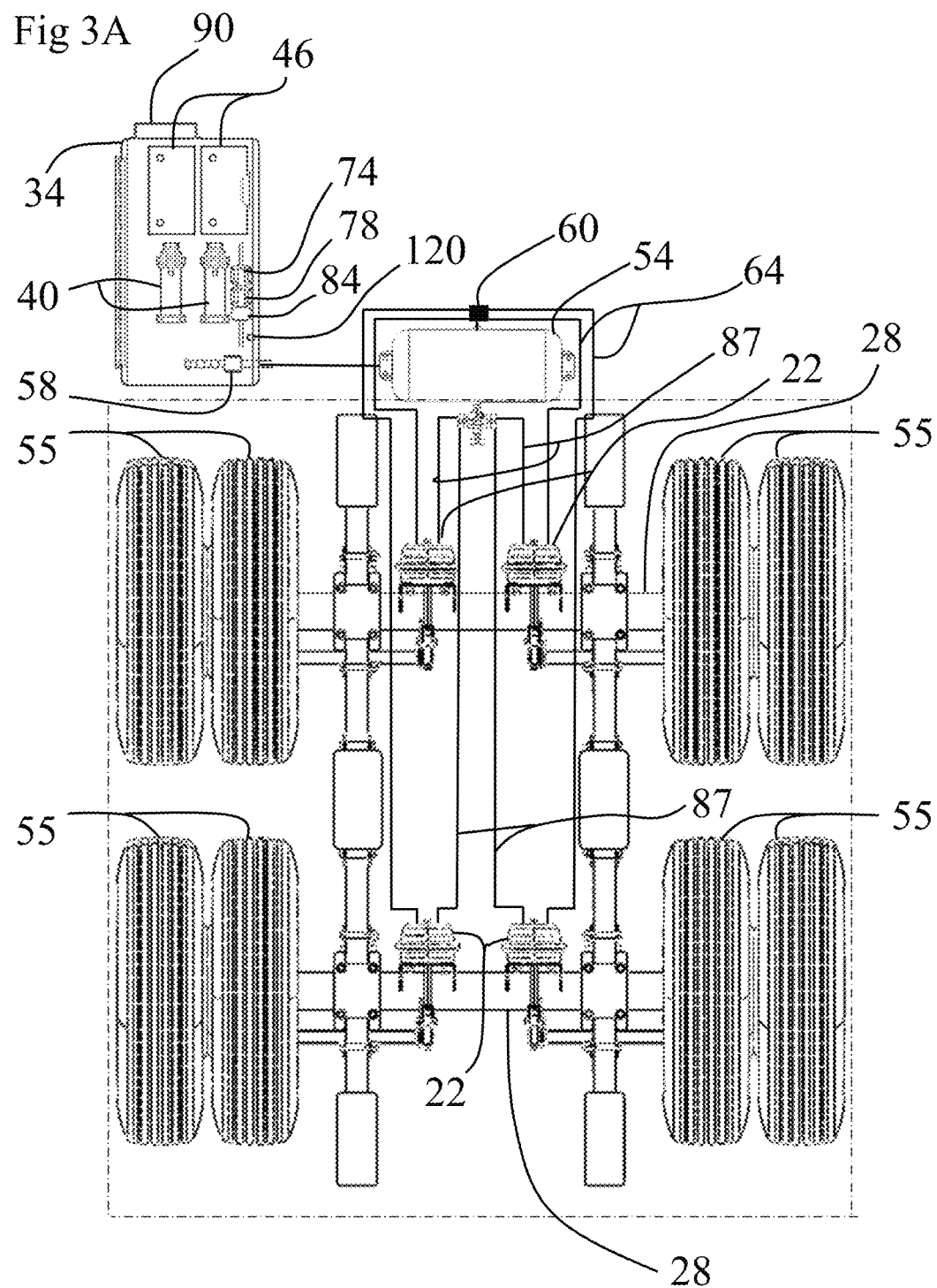

ELECTRICALLY MODULATED AIR BRAKE

CROSS REFERENCE TO RELATED APPLICATIONS

This application claims priority of U.S. Provisional application 63/086,525, filed Oct. 1, 2020, which application is hereby incorporated in its entirety by reference.

BACKGROUND OF THE INVENTION

Many vehicles are equipped to tow trailers with electronically controlled brakes. Frequently, towing vehicles include integrated towing packages that have standard connectors such as flat four and seven pin connectors. As such many vehicles come from the manufacturer with an electronic brake control or are set up to receive an easily installed aftermarket electronic brake controller. When a brake controller is installed as original equipment in a towing vehicle, or an aftermarket controller is installed, the towing vehicle will have an output of an electronic signal that is proportional to the braking force exerted by the towing vehicle's brakes. The proportional braking signal from the towing vehicle is useful to act as in input to a trailer attached to the towing vehicle. The proportional signal from the towing vehicle is a commonly used feature of the seven pin connector on a towing vehicle.

Medium and heavy duty trailers can have air brakes. Therefore, a proportional braking signal is not useful for controlling a typical trailer with air brakes. The input for a typical trailer with air brakes is air pressure from the towing vehicle. Most pickup trucks, or other towing vehicles that are not semi tractors, lack any provisions to supply air through pneumatic lines connected to a trailer having air brakes. An improved system for using standard proportional electrical braking signals from a towing vehicle to control trailers with pneumatic brakes would be useful so that vehicles lacking the complex pneumatic components can tow trailers with air brakes.

SUMMARY OF THE INVENTION

The present invention is a system for controlling the braking of a trailer having an air brake. The trailer has an air compressor that is in fluid communication with a supply tank. The air compressor provides pressurized air to the supply tank. An electrically actuated valve is in fluid communication with the supply tank and the air brake. The electrically actuated valve is for releasing air from the supply tank at a controlled rate. An air line is connected to the supply tank and a spring brake. The spring brake is in a released state when compressed air is applied to it. A release valve is in fluid communication with the supply tank and has an energized state corresponding to the release valve receiving electrical current and a non-energized state in the absence of electrical current. The release valve is open in the non-energized state and releases pressurized air from the supply tank in the non-energized state. A controller actuates and receives a proportional braking signal from a towing vehicle. The proportional braking signal is moveable between a signal representing no braking force from the towing vehicle and a signal representing full braking force from the towing vehicle. The controller is electrically connected to the electrically actuated valve. When the controller receives the proportional braking signal from the towing vehicle representing no braking force, the controller actuates the electrically actuated valve to produce no air pressure to the air brake. Once the controller receives the proportional braking signal from the towing vehicle representing full braking force, the controller actuates the electrically actuated valve to provide air to the air brake corresponding to full braking force of the air brake.

BRIEF DESCRIPTION OF THE DRAWINGS

FIG. 3A is magnified view of area 3A shown in FIG. 3;

DETAILED DESCRIPTION OF INVENTION

Figure 1:
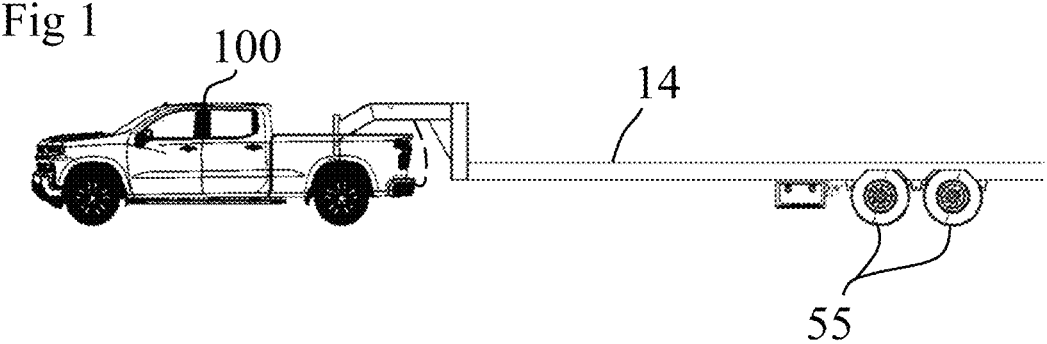
FIG. 1 is a side view of a trailer using the system of the present invention connected to a towing vehicle.

The present invention is a system 8 for controlling air brakes on a trailer using a towing vehicle that has commonly available electrical connections for use with a trailer having electrically controlled brakes that are typically hydraulic brakes or electric brakes. Air brakes are used for their reliability and safety and are typically used in conjunction with a towing vehicle that supplies compressed air through hoses that connect to a trailer that has air brakes. Typical pickup trucks that are used as towing vehicles 100 do not have an air supply that may be connected to a trailer 14 that uses air brakes 22. The air brakes 22 are mounted on the axles 28 of the trailer, as is well known in the art. The internal components of the air brakes 22 are not shown because such components are well known in the art of air brakes. The components of the air brakes will be discussed as necessary to describe how the present invention works with the air brakes 22.

In the case of the trailer 14 shown, the trailer has a frame 32 that includes a toolbox 34 below the deck 38. The deck 38 may be a wooden board deck or other type of material. The trailer 14 is a gooseneck type trailer, as is common for medium to heavy duty trailers. The air brakes 22 may include a service brake chamber that has a diaphragm located within the service brake chamber. The diaphragm in the service brake chamber is connected to a service brake pushrod. When pressurized air is introduced into the service brake chamber, the service brake pushrod extends to an extended position. The service brake chamber also includes a return spring that retracts the service brake pushrod when air is removed from the service brake chamber. The brake also includes a spring brake chamber and a spring brake diaphragm that opposes a spring brake diaphragm within the spring brake chamber. The spring brake chamber includes a spring brake pushrod that is adjacent to the spring brake diaphragm. When pressurized air is introduced into the spring brake chamber, the spring brake pushrod is retracted to a retracted position when the spring brake diaphragm compresses the spring brake spring. When air is removed from the spring brake chamber, the spring brake spring moves the spring brake pushrod to an extended position. Movement of the spring brake pushrod to the extended position causes movement of the service brake pushrod to its extended position. Typically, the service brake pushrod is connected though a yoke and clevis connection to a slack adjuster when drum brakes are used as foundation brakes. A slack adjuster and yoke connection may not be used when disc brakes are used as foundation brakes at the wheels. As is common with drum foundation brakes, a spring brake is used for safety with air disc brakes so that in the absence of pressurized air, the brake spring will actuate the disc brake. In a disc brake, a service brake chamber actuates a piston to actuate the brake 22.

Figure 4:
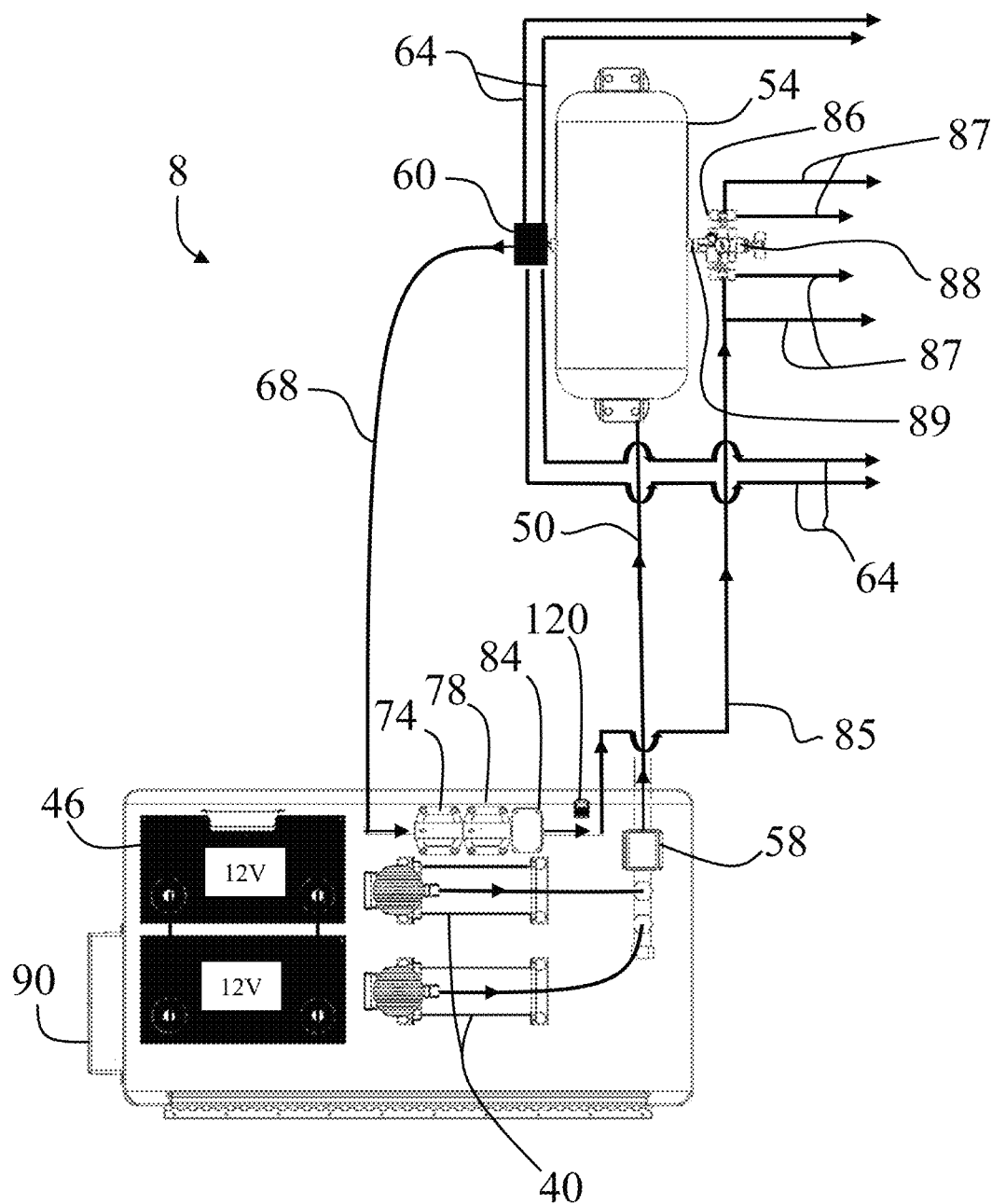
FIG. 4 is a schematic breakout view of the components of the system that is primarily for illustration of the pneumatic connections.

The trailer 14 has a set of compact air compressors 40 that fit within the toolbox 34 below the deck 38. It is contemplated that a single compressor 40 may be used as long as it is appropriately sized. The location of the components within the toolbox 34 is a convenient location on the trailer 14, however, other locations and/or storage containers may work just as well. FIG. 4 shows how the compressors 40 interact with other components of the system. The compressors 40 receive power from batteries 46. As the compressors 40 run, they supply air through line 50 that is connected to supply tank 54. A pressure switch 58 governs the pressure in the supply tank 54. The pressure switch 58 switches the compressors 40 on when the pressure in the supply tank 54 drops below 90 PSI and shuts off the compressors 40 when the pressure in the supply tank 54 reaches 150. As the air pressure in the supply tank 54 rises, pressurized air flows through the manifold 60 to the spring brakes via lines 64. The flow of air though lines 64 into the spring brakes releases them from their locked state so the wheels 55 may rotate. Manifold 60 also directs pressurized air through line 68. Line 68 is connected to a main air filter 74 and a micro air filter 78. The filters 74, 78 lead into an electrically actuated valve 84 that is designed to release air from the supply tank 54 at a controlled rate. The pressurized air released from the electrically actuated valve 84 is directed to the brakes 22 on the trailer 14.

The pressurized air released from the electrically actuated valve 84 is directed through line 85 and into the valve 86. One side of the valve 86 acts as a manifold 88 to distribute pressurized air to individual brake lines 87 that are each connected to a brake 22. In this case, the trailer 14 is a tandem axle trailer and the pressurized air is distributed through four brake lines 87 to each brake 22. Another side of the valve 86 is a pressure release valve 89 that is in fluid communication with the supply tank 54. Opening of the pressure release valve 89 releases all of the pressurized air in supply tank 54. The pressure release valve 89 is a normally open valve and can receive electrical current that energizes the valve and holds it closed. In a non-energized state corresponding to the absence of electrical current, the release valve 89 is open and releases all of the pressure in supply tank 54.

Figure 2:
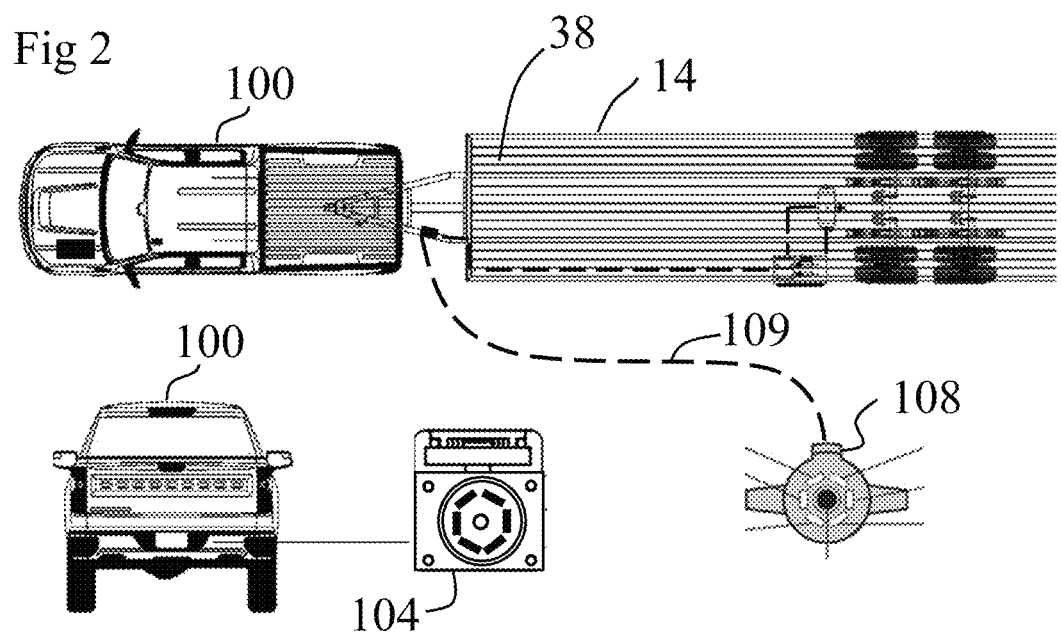
FIG. 2 is a top view of the trailer and towing vehicle of the present invention shown in FIG. 1 that also includes a rear view of the towing vehicle that shows both ends of an electrical connector adjacent to each other.
Figure 3:
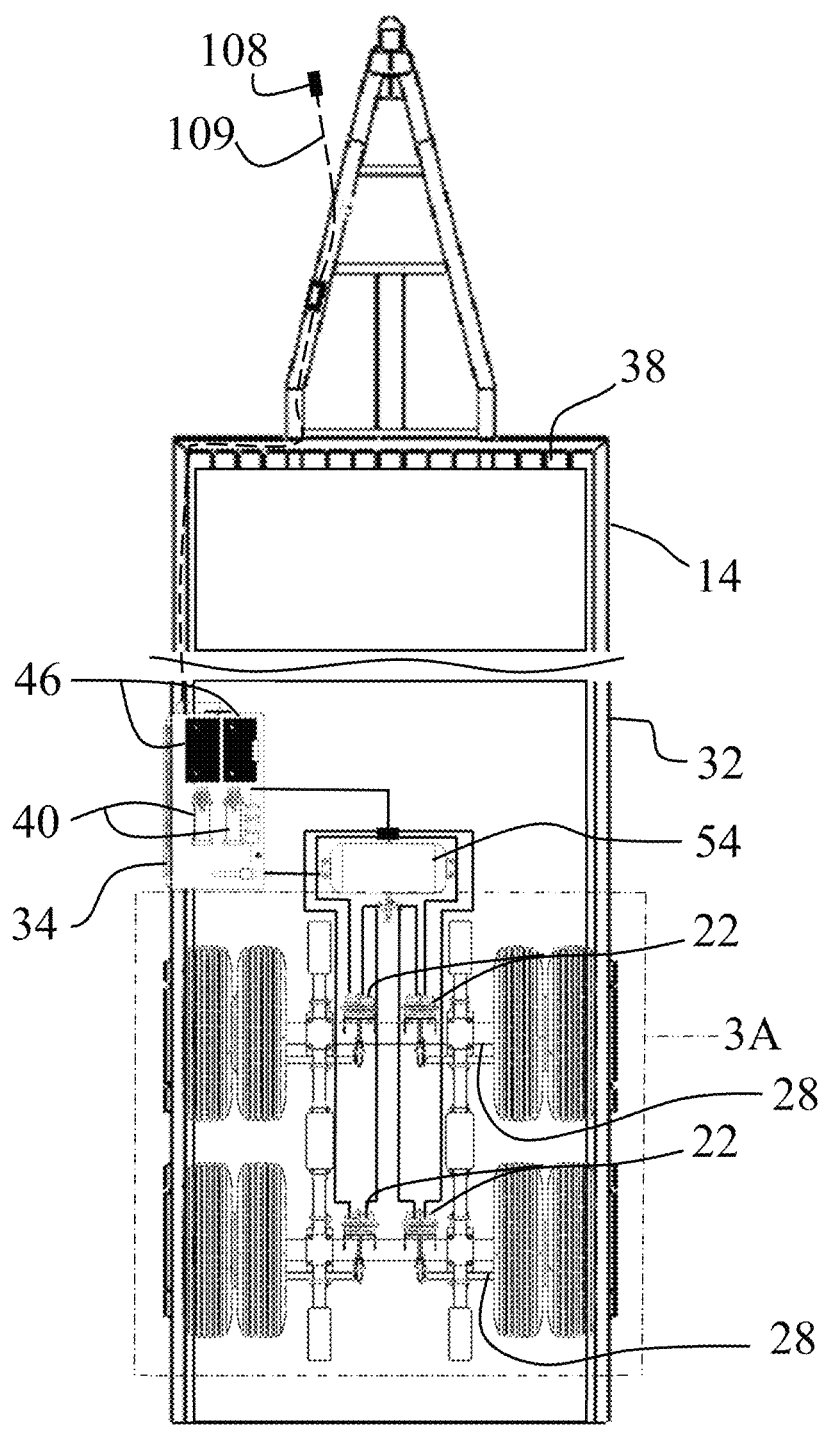
FIG. 3 is a top view of the trailer shown in FIGS. 1 and 2.
Figure 5:
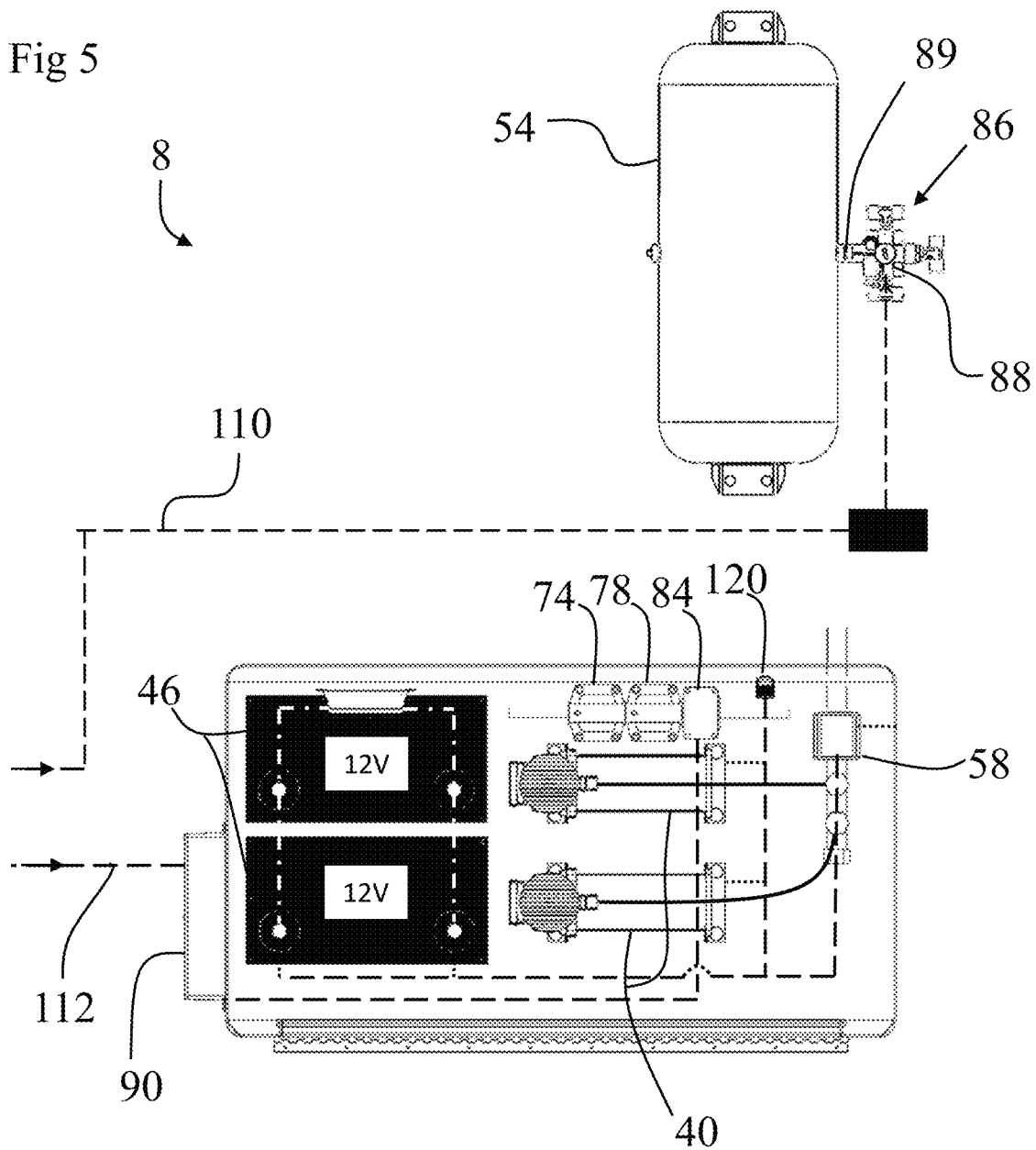
FIG. 5 is a schematic breakout view of the components of the system that is primarily for illustration of the electrical connections of the components.

The controlled release of pressurized air from the electrically actuated valve 84 is directed from a controller 90 that is connected to the electrically actuated valve 84. The controller 90 takes a proportional braking signal that is commonly available on a standard seven pin connector integrated with the towing vehicle 100. FIG. 2 shows a view of the truck end 104 of the seven pin connector and the trailer end 108 of the seven pin connector is also shown. In addition to the proportional braking signal that is available to the trailer 14 when the trailer end 108 of the seven pin connector is connected to the towing vehicle 100, there is also a power connection. The power connection on the seven pin connector from the towing vehicle 100 may be constant power, or may be switched power so that no power is available when the ignition key is in the off position depending on how the towing vehicle 100 is configured. A wiring harness 109 extending from the trailer end 108 of the seven pin connector includes a constant power wire 110 and a wire 112 for the proportional braking signal. FIG. 5 shows how the wires 110, 112 are connected to the components. The proportional braking signal is fed into the controller 90 which processes the proportional braking signal and outputs a signal to the electronically actuated valve 84. The proportional braking signal from the towing vehicle 100 is movable between a signal representing no braking force from the towing vehicle 100 and a signal representing full braking force from the towing vehicle 100. When the controller 90 receives the proportional braking signal from the towing vehicle 100 representing no braking force, no air is supplied to the brakes 22 on the trailer 14. Likewise, when the controller 90 receives the proportional braking signal from the towing vehicle 100 representing full braking force, air is supplied to the brakes 22 on the trailer corresponding to full braking force on trailer 14. In this manner, the controller 90 actuates the brakes though controlling the electrically actuated valve 84 in a proportional manner to the signal it receives from the towing vehicle 100.

The system of the present invention may also provide information and configurability through a wireless connection. That wireless connection may be from the system 8 to a device in the towing vehicle 100 that could display information on a panel in the towing vehicle, or that wireless connection may be to a Bluetooth device such as a phone. Information that may be displayed wirelessly can include, the pressure in the supply tank 54, voltage in the batteries 46 on the trailer 14, and pressure being supplied to the brakes 22 on the trailer 14 through lines 64. Wireless configuration may be made to the system 8 such as changing the amount of braking force applied to the trailer brakes 22 in response to changing loads on the trailer 14. Another configuration that may be made from the Bluetooth device is purposely applying the trailer brakes. At certain times a user may want to purposefully lock the brakes 22 and one of those times may be loading heavy equipment onto the trailer. At times when heavy excavating equipment or other implements are loaded on the trailer, the weight of the equipment being placed on the trailer can lift weight from the wheels of the towing vehicle and cause the towing vehicle 100 to lurch forward. The ability to lock the wheels 55 of the trailer at appropriate times is a useful safety feature. Additionally, a user may wish to intentionally lock the service brakes during a department of transportation inspection to prove the brakes 22 work.

When a user of the trailer 14 has connected it to the towing vehicle 100 he will connect the trailer end 108 of the seven pin connector to the towing vehicle 100. Once the trailer end 108 of the seven pin connector is connected to the towing vehicle 100 and it delivers power through the constant power wire 110, relay 120 will be activated that will switch on the compressors 40 until the maximum PSI is reached in the supply tank 54. The constant power wire 110 also delivers power to release valve 89, thereby closing the release valve 89. As the compressors 40 pressurize the supply tank 54, air will be directed through the manifold 60 and thereby releasing the spring brakes. This will also make air available to the electrically actuated valve 84. Although pressurized air is available to the electrically actuated valve 84 at that time, the service brakes will not be activated until the controller 90 receives a proportional braking signal and actuates the electrically actuated valve 84 in proportion to that proportional braking signal so the electrically actuated valve 84 can release pressurized air from supply tank 54 in a controlled manner. That proportional braking signal may be a square wave, DC voltage, or other waveform. The controller 90 processes that signal to actuate the electrically actuated valve 84 to release an amount of pressurized air that provides proportional braking force at the trailer 14. In the event that the trailer end 108 of the seven pin connector is disconnected from the towing vehicle 100, that will disconnect the constant power wire 110 from current that the towing vehicle 100 supplies. As such, when the trailer end 108 is disconnected, pressure will be released from the supply tank 54 and this will cause the spring brakes to activate and lock the wheels 55 on the trailer 14. In this manner, the trailer end 108 of the seven pin connector can replace traditional lanyards that were required with traditional electrical brakes. The lanyards on traditional electric brakes are typically connected to a non-conductive strip held between a normally closed safety switch that activates the electronic brakes when the lanyard is pulled in the event of a trailer separation. These switches on trailers with traditional electric brakes have been proven to be notoriously unreliable. The traditional safety switches often stick open and provide no utility when the lanyard is pulled because the switch will not actuate the brakes in the stuck open position. In addition to being unreliable, the traditional safety switches require an operator to consciously remember an additional step of attaching the lanyard. The attachment of the trailer end 108 of the seven pin connector of the present system 8 cannot be overlooked because the spring brakes on the trailer 14 will remain locked until the trailer end 108 is connected to the towing vehicle. In other words, it is impossible for the user to forget to plug in the trailer end 108 of the seven pin connector. In the event of a trailer 14 disconnected using the present system 8, the trailer brakes 22 will lock automatically when the supply tank 54 is discharged as the release valve 89 opens in the absence of electrical current and the spring brakes activate. This enables the trailer 14 to be safely loaded and unloaded when the trailer end 108 is disconnected and is particularly useful when trailers 14 are left at a location without the towing vehicle 100.

The invention is not limited to the details above but may be modified within the scope of the following claims.

What is claimed is:

1. A system for controlling a braking force applied to a trailer, said system comprising:
    said trailer having an air brake located on an axle, said air brake including a service brake chamber including a diaphragm located within said service brake chamber and a service brake pushrod connected to said diaphragm so that said diaphragm extends said service brake pushrod to an extended position when pressurized air is introduced into said service brake chamber and said service brake chamber including a return spring to retract said service brake pushrod to a retracted position when air is removed from said service brake chamber, said air brake including a spring brake chamber including a spring brake diaphragm located within said spring brake chamber and a spring brake pushrod adjacent said spring brake diaphragm so that when pressurized air is introduced into said spring brake chamber, said spring brake pushrod is retracted to a retracted position and said spring brake diaphragm compresses a spring brake spring, when air is removed from said spring brake chamber, said spring brake spring moves said spring brake pushrod to an extended position and movement of said spring brake pushrod to said extended position causing movement of said service brake pushrod to its said extended position; movement of said service brake pushrod to its said extended position actuating a foundation brake;
    said trailer including an air compressor in fluid communication with a supply tank said air compressor providing pressurized air to said supply tank;
    an electrically actuated valve in fluid communication with said supply tank and in fluid communication said service brake chamber, said electrically actuated valve for releasing air from said supply tank at a controlled rate;
    an air line connecting said supply tank and said spring brake chamber in fluid communication;
    a release valve in fluid communication with said supply tank and having an energized state corresponding to said release valve receiving electrical current and a non-energized state in the absence of electrical current, said release valve being open in said non-energized state and releasing said pressurized air from said supply tank in said non-energized state;
    a controller for receiving a proportional braking signal from a towing vehicle, said proportional braking signal moveable between a signal representing no braking force from said towing vehicle and a signal representing full braking force from said towing vehicle, said controller electrically connected to said electrically actuated valve, when said controller receives said proportional braking signal from said towing vehicle representing no braking force, said controller actuates said electrically actuated valve to provide no air pressure to said service chamber of said air brake and when said controller receives said proportional braking signal from said towing vehicle representing full braking force, said controller actuates said electrically actuated valve to provide air to said service chamber of said air brake corresponding to full braking force of said brake on said axle of said trailer.

2. A system for controlling a braking force applied to a trailer as claimed in claim 1, wherein said release valve is connected to a power source from said vehicle through a connector connectable with said vehicle, disconnection of said connector from said towing vehicle disconnecting said power source and thereby releasing said air in tank wherein said connector is disconnected from said towing vehicle.

3. A system for controlling a braking force applied to a trailer as claimed in claim 2, wherein said connector provides power to a relay when connected to said power source on said towing vehicle and on receipt of said power, said relay activates said compressor.

4. A system for controlling a braking force applied to a trailer as claimed in claim 1, wherein said trailer includes a battery said battery connected to a connector connectable to said towing vehicle and said connector providing power to said battery from said towing vehicle, said battery powering said compressor.

5. A system for controlling a braking force applied to a trailer, said system comprising:
    said trailer having an air brake located on an axle;
    said trailer including an air compressor in fluid communication with a supply tank said air compressor providing pressurized air to said supply tank;
    an electrically actuated valve in fluid communication with said supply tank and in fluid communication said air brake, said electrically actuated valve for releasing air from said supply tank at a controlled rate;

an air line connecting said supply tank and a spring brake, said spring brake being in a released state when compressed air is applied thereto;

a release valve in fluid communication with said supply tank and having an energized state corresponding to said release valve receiving electrical current and a non-energized state in the absence of electrical current, said release valve being open in said non-energized state and releasing said pressurized air from said supply tank in said non-energized state;

a controller for receiving a proportional braking signal from a towing vehicle, said proportional braking signal moveable between a signal representing no braking force from said towing vehicle and a signal representing full braking force from said towing vehicle, said controller electrically connected to said electrically actuated valve, when said controller receives said proportional braking signal from said towing vehicle representing no braking force, said controller actuates said electrically actuated valve to provide no air pressure to said air brake and when said controller receives said proportional braking signal from said towing vehicle representing full braking force, said controller actuates said electrically actuated valve to provide air to said air brake corresponding to full braking force of said air brake on said axle of said trailer.

6. A system for controlling a braking force applied to a trailer as claimed in claim 5, wherein said release valve is connected to a power source from said vehicle through a connector connectable with said vehicle, disconnection of said connector from said towing vehicle disconnecting said power source and thereby releasing said air in tank wherein said connector is disconnected from said towing vehicle.

7. A system for controlling a braking force applied to a trailer as claimed in claim 6, wherein said connector provides power to a relay when connected to said power source on said towing vehicle and on receipt of said power, said relay activates said compressor.

8. A system for controlling a braking force applied to a trailer as claimed in claim 5, wherein said trailer includes a battery said battery connected to a connector connectable to said towing vehicle and said connector providing power to said battery from said towing vehicle, said battery powering said compressor.

9. A system for controlling a braking force applied to a trailer, said system comprising:
    said trailer having an air brake located on an axle;
        said trailer including an air compressor in fluid communication with a supply tank said air compressor providing pressurized air to said supply tank;
        an electrically actuated valve in fluid communication with said supply tank and in fluid communication said air brake, said electrically actuated valve for releasing air from said supply tank at a controlled rate;
        an air line connecting said supply tank and a spring brake, said spring brake being in a released state when compressed air is applied thereto;
        a controller for receiving a proportional braking signal from a towing vehicle, said proportional braking signal moveable between a signal representing no braking force from said towing vehicle and a signal representing full braking force from said towing vehicle, said controller electrically connected to said electrically actuated valve, when said controller receives said proportional braking signal from said towing vehicle representing no braking force, said controller actuates said electrically actuated valve to provide no air pressure to said air brake and when said controller receives said proportional braking signal from said towing vehicle representing full braking force, said controller actuates said electrically actuated valve to provide air to said air brake corresponding to full braking force of said air brake on said axle of said trailer; and
        a release valve in fluid communication with said supply tank and having an energized state corresponding to said release valve receiving electrical current and a non-energized state in the absence of electrical current, said release valve being open in said non-energized state and releasing said pressurized air from said supply tank in said non-energized state.

10. A system for controlling a braking force applied to a trailer as claimed in claim 9, wherein said trailer includes a battery said battery connected to a connector connectable to said towing vehicle and said connector providing power to said battery from said towing vehicle, said battery powering said compressor.

11. A system for controlling a braking force applied to a trailer as claimed in claim 9, wherein said release valve is connected to a power source from said vehicle through a connector connectable with said vehicle, disconnection of said connector from said towing vehicle disconnecting said power source and thereby releasing said air in tank wherein said connector is disconnected from said towing vehicle.

12. A system for controlling a braking force applied to a trailer as claimed in claim 11, wherein said connector provides power to a relay when connected to said power source on said towing vehicle and on receipt of said power, said relay activates said compressor.

* * * * *